United States Patent [19]

Hasegawa et al.

[11] Patent Number: 4,804,244

[45] Date of Patent: Feb. 14, 1989

[54] CONNECTOR FOR OPTICAL FIBER

[75] Inventors: Kazuo Hasegawa; Yoshinori Miyahara, both of Furukawa, Japan

[73] Assignee: Alps Electric Co., Ltd., Japan

[21] Appl. No.: 841,877

[22] Filed: Mar. 20, 1986

[30] Foreign Application Priority Data

Mar. 20, 1985 [JP] Japan .................................. 60-40102

[51] Int. Cl.$^4$ .............................................. G02B 5/14
[52] U.S. Cl. .................................................. 350/96.20
[58] Field of Search ............... 350/96.20, 96.21, 96.22, 350/96.23

[56] References Cited

U.S. PATENT DOCUMENTS

| | | | |
|---|---|---|---|
| 4,101,198 | 7/1978 | Heldt | 350/96.21 |
| 4,146,299 | 3/1979 | Wellington et al. | 350/96.20 |
| 4,204,306 | 5/1980 | Makuch | 350/96.20 |
| 4,354,731 | 10/1982 | Mouissie | 350/96.20 |
| 4,429,949 | 2/1984 | Cartier | 350/96.21 |
| 4,448,483 | 5/1984 | Ryley, Jr. | 350/96.21 |
| 4,468,087 | 8/1984 | Milan et al. | 350/96.21 |
| 4,541,685 | 9/1985 | Anderson | 350/96.20 |
| 4,674,833 | 6/1987 | Des Forges et al. | 350/96.21 |
| 4,679,895 | 7/1987 | Huber | 350/96.21 |
| 4,696,537 | 9/1987 | Bauer et al. | 350/96.2 |
| 4,697,871 | 10/1987 | Cook | 350/96.2 |

Primary Examiner—Deborah L. Kyle
Assistant Examiner—Michael J. Carone
Attorney, Agent, or Firm—Guy W. Shoup; Paul J. Winters; Leighton K. Chong

[57] ABSTRACT

An optical fiber connector in which an optical fiber and an optical conversion element are detachably coupled together, and optical fibers are mutually coupled together. The connector comprises a holding member composed of a front tube portion for holding the optical fiber and a rear tube portion for holding an optical fiber cable, the rear tube portion being formed with a slit in an axial direction thereof, the rear tube also having a fixed tube fitted thereover to press the rear tube portion. The rear tube portion is formed with more than on notches which intersect the slit, and engaging surfaces formed in the notches are brought into engagement with ends of the fixed tube.

4 Claims, 4 Drawing Sheets

CONNECTOR FOR OPTICAL FIBER

BACKGROUND OF THE INVENTION

1. Field of the Invention

The present invention relates to a connector for an optical fiber in which an optical fiber and an optical conversion element are detachably coupled together or optical fibers are detachably coupled each other, and particularly relates to the construction of a connector which can be simply assembled and inspected and repaired.

2. Description of the Prior Art

An optical information transmission system using optical fibers and optical conversion elements has been used increasingly. People expect much from optical fibers as one of information transmission lines which are less loss yet large capacity.

The optical information transmission system has to use a connector in order to couple the optical fiber to the optical conversion element or couple the optical fibers each other.

Among the connectors, the prior art means for coupling the optical conversion element to the optical will be described with reference to FIGS. 8 to 10.

A holding member 1 comprises a front tube portion 1a, a rear tube portion 1b and a flange portion 1c provided therebetween. a plurality of slits 1d are formed in an axial direction in the outer peripheral surface of the rear tube portion 1b, an optical fiber 2 is inserted through the rear tube portion 1 to hold the optical fiber 2 at the front tube portion 1a, and an optical fiber cable 3 coated by a coating portion 3a is held on the rear tube portion 1b. Then, a fixed tube 4 is fitted over the rear tube portion 1b to reduce the diameter of the rear tube portion 1b to lock the optical fiber cable 3. The front tube portion 1a of the holding member 1 is inserted into a tube portion 6a of an optical receptacle 6 internally provided with an optical conversion element 5, and a cap nut 7 having a projection 7a in the inner periphery thereof is threadedly engaged with the tube portion 6a of the optical receptacle 6 whereby the optical conversion element 5 and the optical fiber 2 may be detachably coupled.

However, the above-described prior art has the following difficulties.

In the past, the optical fiber cable 3 is inserted into the holding member 1 so that the fixed tube 4 is brought into fit in and contact with the rear tube portion 1b of the holding member 1, and therefore, the inner peripheral surface of the fixed tube 4 is merely secured in a surface contact state to the outer peripheral surface of the rear tube portion 1b. Thus, when an axial careless force is applied to the fixed tube 4 or after a lapse of the use, the fixed tube 4 is axially displaced and tends to be slipped out of the rear tube portion 1b.

Accordingly, when the fixed tube 4 is blindly moved, the optical fiber cable 3 being inserted into the rear tube portion 1b also tends to be slipped out. For this reason, the coupling efficiency of the optical fiber and optical conversion element or the mutual optical fibers ia deteriorated, thus bringing forth unfavorable results for the optical information transmission system.

There is previously proposed, as shown in FIG. 9, a system in which a shoulder 1e is provided on the outer peripheral surface of the rear tube portion 1b to prevent the fixed tube 4 from being slipped out. In this case, the optical fiber becomes hard to be slipped out of the holding member 1 but when the fixed tube 4 is once locked, it becomes difficult to remove the fixed tube 4 due to the presence of the shoulder 1e to make it impossible to separate the optical fiber from the holding member. Furthermore, since the work for mounting the fixed tube 4 is carried out, a rear portion of a cap nut has to be removed in advance, thus lacking in conditions of installing and removing operability required for the optical connector.

SUMMARY OF THE INVENTION

It is therefore an object& of the present invention to provide a connector for optical fibers in which the optical fibers are positively secured to the holding member, the coupling efficiency inherent in the connector for the optical fibers may be enhanced, and installing and removing operation for the optical fibers may be extremely easily performed, while removing various difficulties noted above with respect to the prior art.

In order to achieve the aforesaid object, the present invention provides a connector for an optical fiber comprising a holding member composed of a front tube portion for holding the optical fiber and a rear tube portion for holding an optical fiber cable, the rear tube portion being formed with a slit in the axial direction thereof, the rear tube portion having a fixed tube fitted thereover to press the rear tube portion, wherein the rear tube portion of the holding member is formed, in a contactable surface thereof to be fitted and in contact with the fixed tube when the latter is fitted thereover, with more than one notches which intersect the slit, and engaging surfaces formed in the notches are brought into engagement with ends of the fixed tube.

As being constructed as described above, in the present invention, the optical fiber is inserted into the holding member, and then the fixed tube is firmed fitted over the rear tube portion of the holding member by way of caulking or press-in so that the inner peripheral surface of the fixed tube is positioned in the notches formed in the rear tube portion. With this, the inner peripheral surface of the fixed tube presses the rear tube portion to reduce the diameter thereof, and the coating portion of the optical fiber and corner portions formed in the inner peripheral surface of the notches come into press and contact with each other in the intersecting relation with the result that the outer end portion of the coating portion is thickly swelled to raise the portion in the neighbourhood of the notches formed in the rear tube portion. Since the engaging surface of the raised portion and the end of the fixed tube are brought into engagement with each other, the fixed tube is never slipped out of the rear tube portion and therefore the holding member and optical fiber may be positively locked. When the end of the rear tube portion is pressed centripetally, the engagement between the engaging surface and the end of the fixed tube is released and therefore, the fixed tube may be simply removed from the holding member without difficulty.

BRIEF DESCRIPTION OF THE DRAWINGS

FIGS. 1 and 2 are respectively sectional views of the connector;

FIG. 3 is a separated perspective view thereof;

FIGS. 4 and 5 are respectively sectional views showing the coupling construction between the optical fiber and the optical conversion element;

FIG. 6 is a separated perspective view showing a plug for the optical fiber thereof;

FIG. 7 is a separated perspective view showing one example of a holding member;

DETAILED DESCRIPTION OF THE INVENTION AND PREFERRED EMBODIMENTS

The embodiment of the connector for the optical fiber in accordance with the present invention will now be described with reference to FIGS. 1 to 7.

Figure 1:
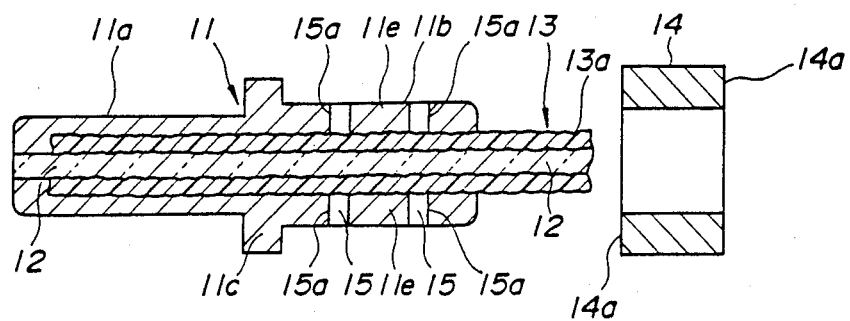
FIGS. 1 to 7 show an embodiment of a connector for an optical fiber in accordance with the present invention.
Figure 7:
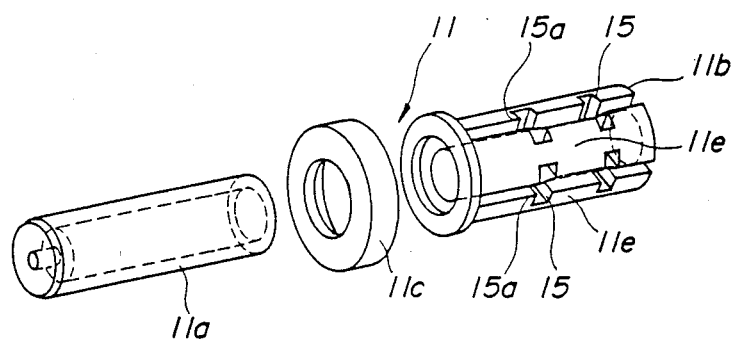
Figure 8:
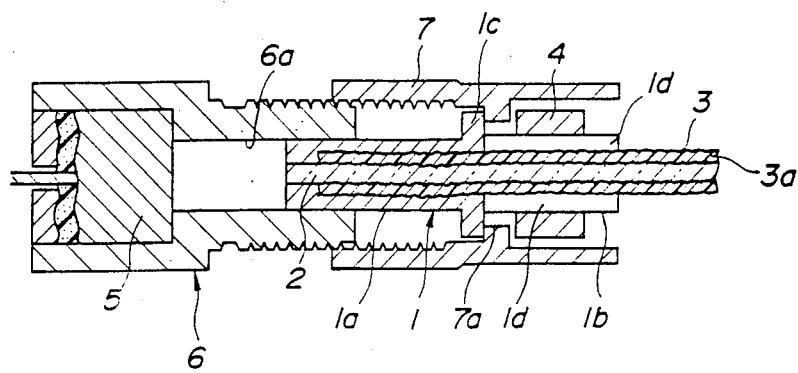
FIGS. 8 and 9 are respectively sectional views showing prior art.
Figure 9:
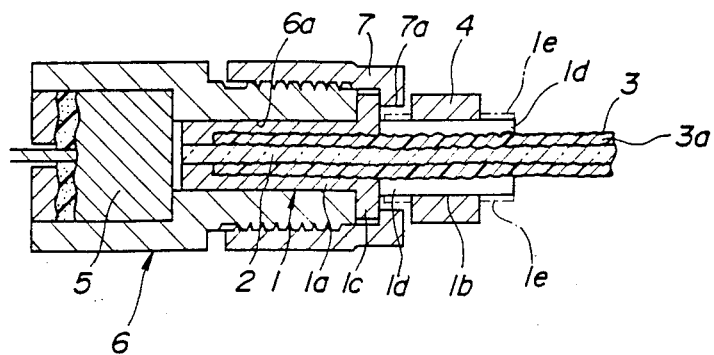
Figure 10:
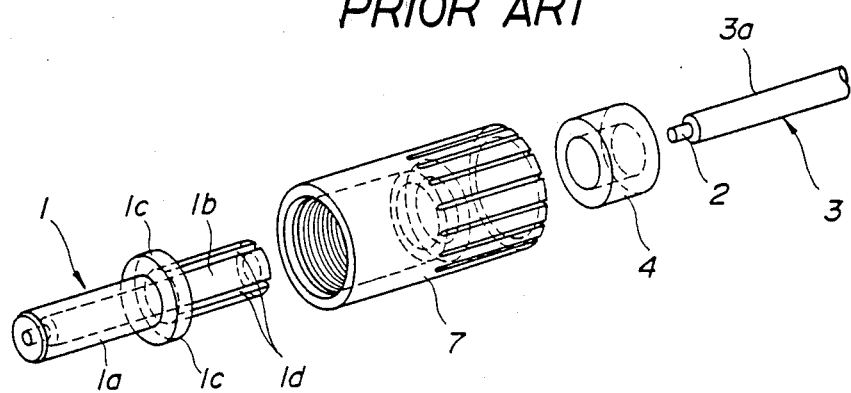
FIG. 10 is a separated perspective view showing a plug for the conventional optical fiber.

Referring now to FIG. 1 a holding member 11 comprises a front tube portion 11a forwardly thereof, a flange portion 11c in the middle portion thereof, and a rear tube portion 11b rearwardly thereof, these portions being integrally formed. Alternatively, as shown in FIG. 7, the front tube portion 11a, the rear tube portion 11b and the flange portion 11c can be formed separately, which are connected together by means such as adhesives, pressure bonding, etc. to form the holding member 11. The rear tube portion 11b of the holding member 11 is formed with a few slits 11d in the axial direction of the holding member 11.

A forward portion of an optical fiber 12 is inserted into and held by the front tube portion 11a, an optical fiber cable 13 having a coating portion 13 having the outer peripheral portion of the optical fiber 12 coated is inserted into and held by the rear tube portion 11b, and the fore-end surface of the optical fiber 12 and the fore-end surface of the front tube portion 11a are polished to provide for face.

A fixed tube 14 has the inside diameter slightly smaller than the outside diameter of the rear tube portion 11b so that when the fixed tube is fitted over the rear tube portion 1, the rear tube portion 11b is reduced in diameter. The fixed tube 14 is to be formed into shapes such as a circle, a square etc. according to the shape of the rear tube portion 11b. Where the fixed tube 4 is formed from a metal sleeve, it can be pressed and fixed by caulking.

The rear tube portion 11b is formed, at both ends of a pressing portion 11e to be fitted and placed in contact therewith when the fixed tube 14 is fitted, with notches 15 of suitable length which intersect the slits 11d substantially in the state of intersecting at right angles. The notches 15 are formed at more than on e location in the intersecting relation with the slits 11 so that the corner portions 15b formed in the inner peripheral surface of the notches 15 press and come into contact with the coating portion 13a of the optical fiber cable 13 positioned in the intersecting relation with the corner portions 15b.

When the position of the notch 15 in the coating portion 13a is thickly swelled, the engaging surface 15a of the rear tube portion 11b is raised so that the both ends 14 of the fixed tube 14 engage the engaging surface 15a.

Figure 4:
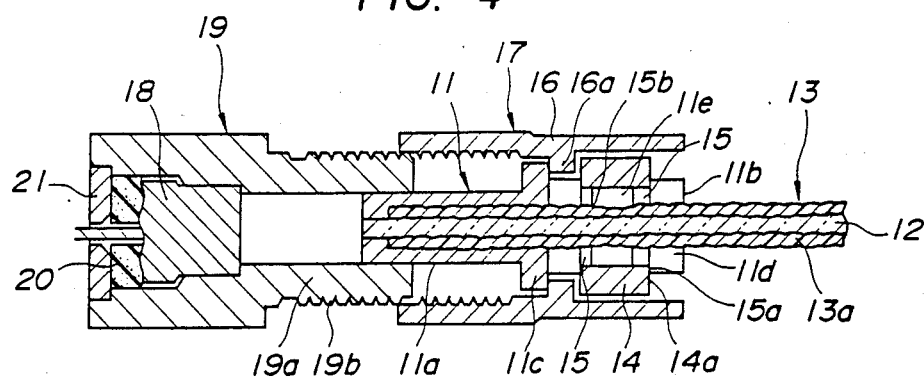
Figure 5:
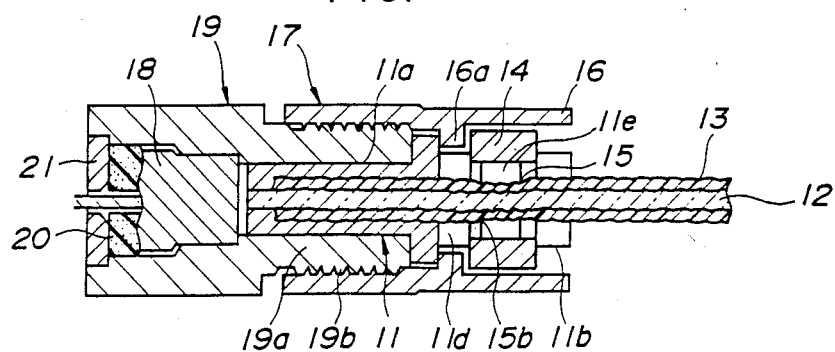
Figure 6:
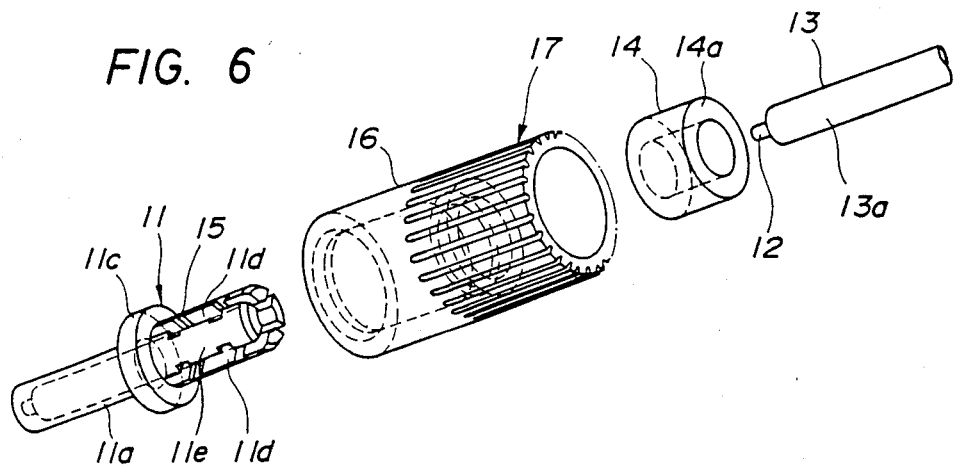

FIGS. 4 and 5 show an embodiment in which an optical fiber and an optical conversion element are coupled. A plug 17 provided with a cap nut 16 in the outer periphery of the holding member 11 and an optical receptacle 19 encasing therein an optical conversion element 18 such as a light emitting element are coupled together. In the case where the optical fibers are mutually coupled, when the aforesaid holding member 11 is inserted into both ends of the unshown adapter, the optical fibers are opposedly coupled.

In the figures, reference numeral 16a designates a projection formed internally of the cap nut 16, 19a a tube portion provided with an optical receptacle 19, said tube portion having threads 19b in the outer peripheral surface thereof, 20 an elastic member, and 21 a stopper.

Next, the operation of the above-described embodiment will be described.

Figure 2:
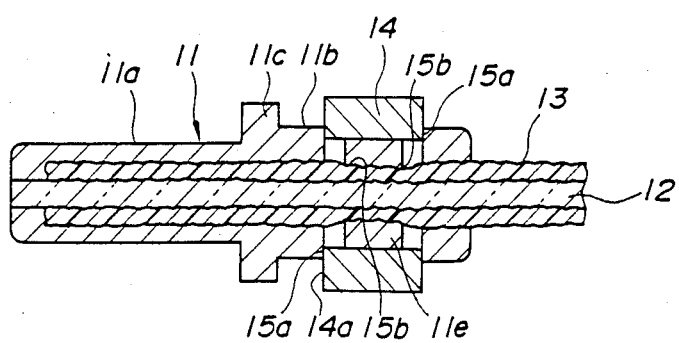
Figure 3:
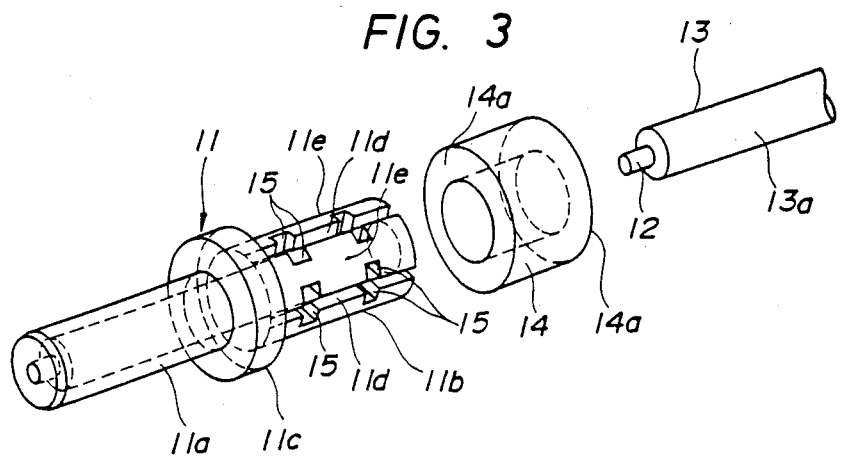

As shown in FIG. 1, the optical fiber 12 and optical fiber cable 13 are inserted into the front tube portion 11a of the holding member 11 and rear tube portion 11b, respectively. Next, the fixed tube 14 is fitted over the rear tube portion 11b, as shown in FIG. 2. Then the rear tube portion 11b having the slit 11d is reduced in diameter, and the inner peripheral surface of the fixed tube 14 presses the pressing portions 11e of the rear tube portion 11b.

At that time, the corner portions 15b formed in the inner peripheral surface of the notches 15 press and come into contact with &he coating portion 13a of the optical fiber cable 13 in the intersecting relation to swell outwardly the outer end portion of the coating portion 13a, and a part of the rear tube portion 11b positioned outwardly of the notches 15 is raised by said swelled portion.

The engaging surfaces 15a provided in the raised portion and both the ends 14a of the fixed tube 14 become engaged, and therefore, the optical fiber is positively locked at the holding member 11 and the fixed tube 14 is not possibly slipped out of the ear tube portion 11b.

On the other hand, in the event the fixed tube 14 is removed, when the end having the engaging surface 15a of the rear tube portion 11b is pressed centripetally, the pressing portion is reduced in diameter to release the engagement between the engaging surface 15a and the both ends 14a of the fixed tube 14. Therefore, the fixed tube 14 may be simply pulled out of the rear tube portion 11b.

FIG. 4 shows an example in which an optical fiber and an optical conversion element are coupled, in which case, the optical fiber is secured to the holding member 11 through the fixed tube 14, and the cap nut 16 is provided on the outer periphery of the holding member 11 to constitute the plug 17. In this case, the fixed tube 14 remains positively locked while being covered by the rear portion of the cap nut 16.

Subsequently, when the front tube portion 11a of the plug 17 is inserted into the tube portion 19a of the optical receptacle 19 and the cap nut 16 is tightened, both the elements may be positively coupled as shown in FIG. 5.

As described above, in the present invention, since the notches intersecting the slits are formed in the rear tube portion of the holding member, the fixed tube presses the rear tube portion so that the corner portions formed in the notches and the coating portion of the optical fiber cable are pressed and brought& into contact with each other in the intersecting relation, as a consequence of which a part of the rear tube portion is raised by the outer end portion of the thus pressed coating portion to cause the both ends of the fixed tube to engage the engaging surfaces of the rear tube portion. Thus, the fixed tube is never slipped out in the axial direction of the rear tube portion. Moreover, since the fixed tube may be simply removed from the rear tube portion by pressing the end of the rear tube portion, the separating operation for the optical fiber may be done extremely easily.

Accordingly, the optical fiber is positively secured to the holding member and can well withstand its use for a long period of time, thus further improving the optical coupling efficiency as the optical fiber connector.

Moreover, the installing and removing operation of the optical fiber may be easily performed with the simple construction, and therefore, the practical value of the optical fiber connector is extremely great.

What is claimed is:

1. A connector for an optical fiber cable having an optical fiber in a cable covering, said connector including a holding member comprising:
   a front cylindrical part for holding an end of the optical fiber;
   a rear cylindrical part for holding the optical fiber cable which is integrally provided with said front cylindrical part and which has a length between its opposite ends provided with an outer surface of a first diameter and an inner surface in contact with the cable covering of the optical fiber;
   at least one slit formed along said rear cylindrical part extending in an axial direction of the optical fiber;
   a plurality of notches in said rear cylindrical part intersecting said at least one slit in a circumferential direction of the optical fiber, said notches extending radially to the outer surface of said rear cylindrical part at an intermediate portion of the length thereof; and
   a fixed member having an inner surface with a diameter less than said first diameter of said outer surface of said rear cylindrical part, which is pressed on to said outer surface at said intermediate portion where said recesses are located for applying pressure by said lesser diameter to press said rear cylindrical part in a radially inward direction thereof to securely hold the optical fiber cable from axial displacement, wherein the outer surface of said rear cylindrical part beyond said fixed member becomes projected radially outward relative to said inner surface of said fixed member to securely hold said fixed member thereon, and said fixed member can be removed by axially pulling said fixed member over the outer surface of said rear cylindrical part.

2. A connector according to claim 1, wherein said fixed member is in the form of a metal tubular sleeve.

3. A connector according to claim 1 for optically coupling the optical fiber to an optical conversion element mounted in a receptacle, further comprising a plug attached on said holding member and having a threaded portion for engagement with a corresponding portion of said receptacle.

4. A connector according to claim 1 for optically coupling two optical fibers together, wherein each of the optical fibers is held in a respective one of said holding members, and said connector further comprising an adapter having opposing ends for receiving therein the front cylindrical parts of said holding members, respectively.

* * * * *